Patented May 13, 1930

1,758,381

UNITED STATES PATENT OFFICE

JULIUS VON BRAUN AND OTTO BAYER, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS OF CATALYTICALLY REDUCING ANTHRAQUINONE COMPOUNDS AND NEW HYDROGENIZED PRODUCTS DERIVED THEREFROM

No Drawing. Original application filed February 27, 1926, Serial No. 91,227, and in Germany March 3, 1925. Divided and this application filed June 10, 1927. Serial No. 198,005.

Our invention relates to a new process of catalytically reducing anthraquinone compounds and new hydrogenized products derived therefrom. The process consists in treating the anthraquinone compounds in a nonacidic medium with hydrogen at elevated temperatures and preferably under pressure in the presence of the usual metal reduction or hydrogenation catalysts, advantageously with the addition of an organic solvent or diluent.

It is a very remarkable fact that our process runs in phases, so that according to the quantity of hydrogen allowed to act upon anthraquinone compounds, different products of distinct degrees of hydrogenation can be prepared. If anthraquinone is subjected to this process, in the first phase of the reaction anthranol (or anthrone) is obtained with a practically quantitative yield. In the second phase of reaction tetrahydroanthranol, and by allowing to react still a further quantity of hydrogen, octohydroanthranol is obtained. The final product of the catalytical reduction is octohydroanthracene.

All the known base metal reduction or hydrogenation catalysts are suitable for our process but we have found to be especially effective the mixtures of catalysts prepared for instance by precipitating an aqueous solution of a mixture of nickel sulfate, cobalt sulfate and copper sulfate by means of a carbonate of soda solution.

By the expressions "base metal reduction catalysts" and "base metal hydrogenation catalysts" we purpose to include those known catalytic agents of reduction and/or of hydrogenation which contain one or more of the base metals, which base metals are present in the catalytic agent either in their elemental form or in the form of their respective oxides or salts.

The new process is not limited to anthraquinone itself, as also derivaties of anthraquinone, for example alkyl-, hydroxy-, nitro-, amino anthraquinones, naphthanthraquinone, etc. easily can be catalytically reduced in the described manner.

In order to obtain the higher hydrogenized compounds one may start, instead of from an anthraquinone compound itself, from the anthranol body as the next step of hydrogenation.

The new products are intended to be used as starting materials for the production of dyestuffs and therapeutical products. The following examples illustrate the nature of our invention and in what manner it is to be performed, the parts being by weight and all temperatures in degrees centigrade.

Example 1

A solution of 52 parts of anthraquinone in 100 parts of decahydronaphthalene is treated in an autoclave at 160–170° C. with hydrogen in the presence of a mixture of carbonates of nickel, iron and copper as catalyst, until a quantity of hydrogen is absorbed corresponding to 8 atoms. After diluting the contents of the autoclave with a suitable organic solvent,—for instance, ether,—the solution so obtained is separated from the catalyst and then extracted several times with a diluted soda solution. From this alkaline solution the tetrahydroanthranol is precipitated by acidifying. The thus obtained product of hydrogenation corresponding to the formula:

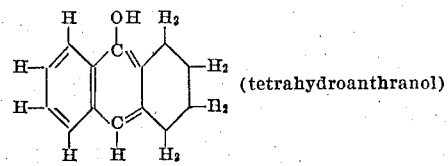

(tetrahydroanthranol)

crystallizes from ligroine in yellowish crystals melting at 108° C. The new compound is easily soluble in alkalies, it yields a benzoyl compound melting at 142° C., an acetyl compound melting at 109° C., a monobromo substitution product melting at 123° C.; it couples with diazo compounds to form azo dyestuffs. By oxidizing it, for instance with chromic acid in glacial acetic acid solution,— a quinone of the formula:

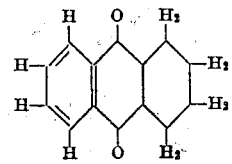

is obtained which has already been described by Schroeder (Berichte der Deutschen Chem. Ges. Vol. 57, 2014).

*Example 2*

If 1.4-dimethylanthraquinone is subjected to our process, a new compound of the tetrahydroanthranol step, having probably the formula:

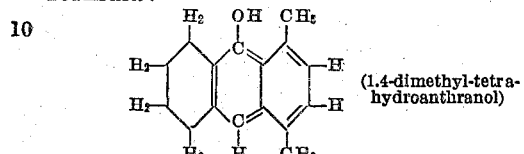

(1.4-dimethyl-tetrahydroanthranol)

is obtained. It crystallizes from petrolether as snow-white long needles, melting at 104° to 106° C. and oxidizable to a quinone.

*Example 3*

By treating tetral-2.3-anthraquinone- of the formula:

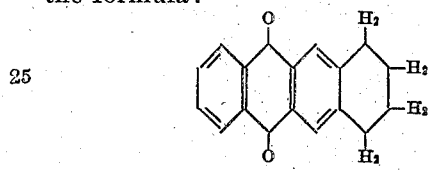

obtainable by condensing tetrahydronaphthalene with phthalic acid anhydride and acting with sulfuric acid on the ortho-(tetroyl-2-)-benzoic acid thus formed with hydrogen in the presence of a catalyst, there is obtained, in a quantitative yield, an anthranol body of the following formula:

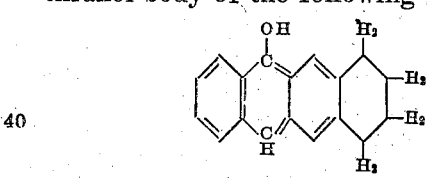

(tetral-2.3-anthranol or 2.3-tetramethyleneanthranol). The new compound crystallizes from benzene as yellowish needles, melting at 141° C.

This application is a division of our copending application Serial No. 91,227, filed Feb. 27, 1926.

We claim:

1. Process of producing a tetrahydroanthranol compound which comprises acting under pressure upon one molecular proportion of an anthraquinone compound in the presence of a base metal hydrogenation catalyst with substantially eight atomic proportions of hydrogen.

2. Process of producing a tetrahydroanthranol compound which comprises acting under pressure upon one molecular proportion of an anthraquinone compound with the addition of an organic diluent in the presence of a base metal hydrogenation catalyst with substantially eight atomic proportions of hydrogen.

3. Process of producing a tetrahydroanthranol compound which comprises acting under pressure at elevated temperatures upon one molecular proportion of an anthraquinone compound in the presence of a base metal hydrogenation catalyst with substantially eight atomic proportions of hydrogen.

4. As new products tetrahydroanthranol compounds of the general formula:

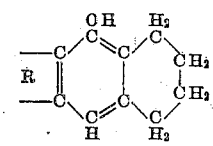

wherein R represents the residue of a hydrocarbon radical of the aromatic series; which tetrahydroanthranol compounds are soluble in alkalies and the usual organic solvents, yield azo dyestuffs when combined with diazo compounds and form acetyl-, benzoyl- and mono-bromo-substitution products.

5. As a new product tetrahydroanthranol of the following formula:

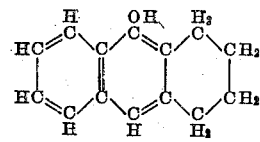

which, when crystallized from ligroin, forms yellow crystals having a definite melting point; is easily soluble in the usual organic solvents and in alkalies, yields azo dyestuffs when combined with diazo compounds and forms an acetyl-, benzoyl- and a mono-bromo-substitution product.

In testimony whereof, we affix our signatures.

JULIUS von BRAUN.
OTTO BAYER.